United States Patent [19]

Andrews

[11] 4,376,020
[45] Mar. 8, 1983

[54] METHOD OF AND APPARATUS FOR CUTTING NARROW GROOVES

[75] Inventor: James D. Andrews, Birmingham, Mich.

[73] Assignee: Electrodrill, Inc., Livonia, Mich.

[21] Appl. No.: 219,840

[22] Filed: Dec. 24, 1980

[51] Int. Cl.³ .............................. B23P 1/12; B23P 1/14
[52] U.S. Cl. ............................... 204/129.5; 204/129.6; 204/212; 204/224 M; 204/284
[58] Field of Search ............. 204/129.5, 129.55, 129.6, 204/224 M, 284, 212, 218, 129.1

[56] References Cited

U.S. PATENT DOCUMENTS

| | | | |
|---|---|---|---|
| 3,130,138 | 4/1964 | Faust et al. | 204/218 X |
| 3,338,808 | 8/1967 | Johnson | 204/284 X |
| 3,377,260 | 4/1968 | Stiff | 204/129.5 X |
| 4,243,862 | 1/1981 | Wetzels | 204/212 X |

Primary Examiner—Donald R. Valentine
Attorney, Agent, or Firm—Harness, Dickey & Pierce

[57] ABSTRACT

A method of and apparatus for electrolytically forming relatively narrow grooves which may extend either part way or entirely through a workpiece, in which excessive groove width is avoided by reducing electrical current density between major sides of the electrode disk and side surfaces of the groove as the groove is being formed. To reduce the density of electrical current between the side surfaces of the groove and the major sides of the electrode disk, the electrode disk is provided with openings which extend between the major sides of the disk, and are positioned radially inwardly from the periphery of the disk. The openings reduce the side surface area of the disk available for the establishment of current flow to thereby tend to minimize the extent to which the sides of the groove are electrolytically eroded during formation of the groove.

11 Claims, 4 Drawing Figures

METHOD OF AND APPARATUS FOR CUTTING NARROW GROOVES

BACKGROUND OF THE INVENTION

This invention relates to a method of and apparatus for cutting narrow grooves either part way or completely through a workpiece by electrolytically removing material from the workpiece.

It has previously been suggested that a groove could be electrolytically cut in a workpiece by using a rotating imperforate disk as an electrode in the manner disclosed in U.S. Pat. No. 3,130,138. As the rotating electrode disk approaches the workpiece, electrical current flows between the workpiece and the electrode disk. The patent states that using an electrode disk to form a groove results in undesirable electrolytic action between the sides of the disk and the groove with a resulting widening of the groove.

The aforementioned U.S. Pat. No. 3,130,138 indicates that solution of the problem of excessive widening of the groove has previously been attempted by providing an electrically insulating coating on the sides of the rotating disk to prevent electrolytic action between the major sides of the disk and the groove. However, these efforts were not satisfactory and improved results in thinness of cuts could be obtained by rotating electrode disks at speeds above 3,000 feet per minute. The patent indicates that the resulting groove will have a width which is about 0.02 inches greater than the thickness of the electrode disk, that is, there will be approximately 0.01 inches of space between each side of the electrode disk and a side surface of the groove. The patent also indicates that an electrode disk as thin as 0.036 of an inch has been used. According to the patent, a disk of this thickness would result in the formation of a groove having a width of approximately 0.056 inches.

Although the apparatus disclosed in the aforementioned patent may be generally satisfactory for some purposes, the apparatus cannot be used to form relatively narrow grooves, that is grooves having a width of 0.011 inch or less. Therefore, other method and apparatus have to be used when relatively thin grooves are to be formed.

SUMMARY OF THE PRESENT INVENTION

The present invention provides a new and improved method of and apparatus for electrolytically forming relatively narrow grooves which may extend either part way or entirely through a workpiece. Excessive groove width is avoided by reducing electrical current density between major sides of the electrode disk and side surfaces of the groove as the groove is being formed. To reduce the density of electrical current between the side surfaces of the groove and the major sides of the electrode disk, the electrode disk is provided with openings which extend between the major sides of the disk. The openings reduce the side surface area of the disk available for the establishment of current flow to thereby tend to minimize the extent to which the sides of the groove are electrolytically eroded during formation of the groove.

In view of the foregoing, it is an object of this invention to provide a new and improved method of and apparatus for electrolytically forming a narrow groove in a workpiece by reducing the density of the electrical current between side surfaces of the groove and major sides of an electrode disk.

Another object of this invention is to provide a new and improved method and apparatus as set forth in the preceding object and wherein openings are provided between opposite major sides of the electrode disk, the openings being moved along side surfaces of the groove to reduce electrical current density.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
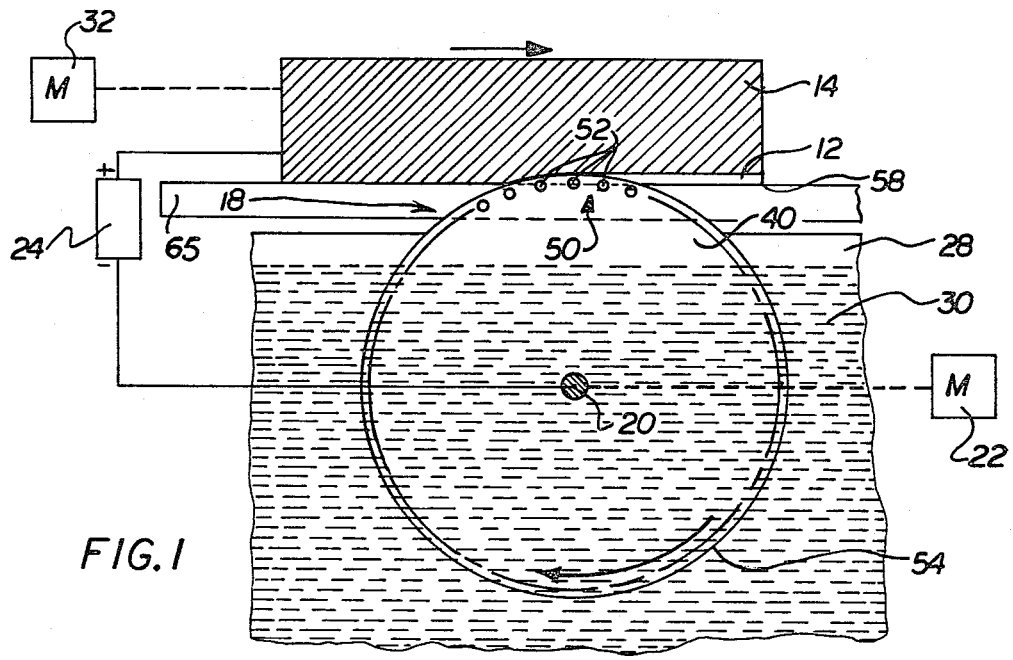
FIG. 1 is a schematic illustration depicting manner in which a narrow groove is formed in a workpiece by using an electrode disk having openings extending between opposite major sides of the disk.

An electrochemical machining apparatus 10 for forming a groove 12 in a workpiece 14 is illustrated schematically in FIG. 1. The apparatus 10 includes a circular electrode disk 18 which is rotated by a drive shaft 20 and motor 22 about a stationary central axis of the disk. An electrical potential is established between the workpiece 14 and electrode disk 18 by a suitable current source 24.

The lower portion of the electrode disk 18 is immersed in a tank 28 of electrolyte. As the disk 18 is rotated, the electrolyte adheres to the disk to establish a continuous flow of electrolyte from the tank to the groove 12. If desired, a stream of electrolyte could be directed into the groove from nozzles or other sources of electrolyte.

When the groove 12 is to be formed in the workpiece 14, the workpiece and electrode disk 18 are moved relative to each other by a drive motor 32. During this relative movement between the workpiece 14 and electrode disk 18, an electrical potential and a flow of electrolyte are maintained in very small spaces between the electrode disk and the workpiece. The workpiece 14 and electrode disk 18 are moved relative to each other at a feed rate such that abutting engagement does not occur between the workpiece and electrode disk 18. Although it is contemplated that the electrode disk 18 could be moved relative to the workpiece 14, the drive motor 32 is connected with the workpiece 14 and effects movement of the workpiece toward the right (as viewed in FIG. 1) while the electrode disk 18 is rotated in a clockwise direction (as viewed in FIG. 1) about a stationary central axis.

In accordance with a feature of the present invention, a narrow groove 12 is formed in the workpiece 14 by reducing the electrical current density between major sides 40 and 42 of the electrode disk 18 and side surfaces 44 and 46 of the groove 12. Reducing the density of the electrical current between the major sides 40 and 42 of the electrode disk 18 and the side surfaces 44 and 46 of the groove 12 reduces the tendency for electrolytic erosion to take place between the electrode disk 18 and the side surfaces 44 and 46 of the groove 12. The narrow groove 12 has a width of 0.011 inch or less and has side surfaces 44 and 46 which extend substantially parallel to the major sides 40 and 42 of the electrode disk 18.

If a relatively high density electrical current was established between the major sides 40 and 42 of the electrode disk and the side surfaces 44 and 46 of the groove 12 after the groove had been formed, a substantially wider groove would result. This is because the presence of the electrode disk 18 in the groove after the groove had been initially formed (see FIG. 2) would cause continued electrolytic removal of material from the side surfaces of the groove. The resulting electrolytic erosion causes excessive flaring of the side surfaces away from the electrode disk.

In order to reduce the density of the electrical current between the major sides 40 and 42 of the electrode disk 18 and the side surfaces 44 and 46 of the groove 12, the electrode disk 18 is provided with an annular array 50 (FIG. 1) of holes or openings 52. The openings 52 are disposed adjacent to a cylindrical outer minor side 54 of the electrode disk 18. Although only a few holes 52 have been shown in FIG. 1, it should be understood that the annular array 50 includes a series of evenly spaced circular holes and extends entirely around the electrode disk 18. It should also be understood that openings 52 having a configuration other than the circular configuration shown in the drawings can be provided. In fact when deeper grooves are to be cut either part way or completely through a workpiece, it is contemplated that it may be preferred to have noncircular openings 52 which extend for a substantial distance radially inwardly from the periphery of the electrode disk 18.

Upon initiation of formation of the groove 12, a leading corner 58 of the workpiece 14 (see FIG. 1) is moved into close proximity with the annular peripheral edge 54 of the electrode disk 18. A relatively dense current flow is established between the annular minor side surface 54 of the electrode disk 18 and the corner portion 58 of the workpiece 14 to initiate formation of the groove 12. The relatively dense current flow between the minor side surface 54 of the electrode disk 18 and the workpiece is established under the influence of an electrical potential provided by the current source 24. At this time, a continuous flow of electrolyte is maintained between the electrode disk 18 and workpiece 14 by lifting of electrolyte from the tank 28 by the electrode disk.

Figures 2, 3, 4:
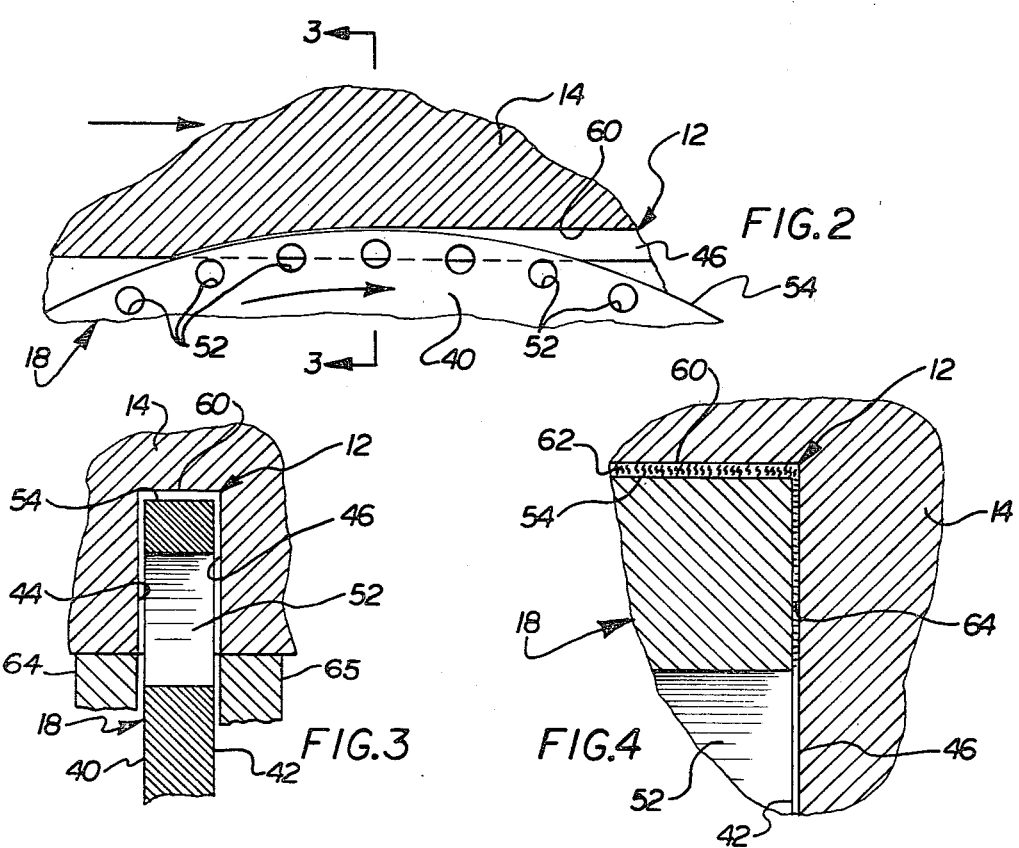
FIG. 2 is an enlarged fragmentary illustration of a portion of the electrode disk and workpiece of FIG. 1 and illustrating the relationship between a plurality of openings in major sides of the electrode disk and a groove formed in a workpiece during the formation of the groove.
FIG. 3 is an enlarged fragmentary sectional view, taken generally along the line 3—3 of FIG. 2, further illustrating the relationship between the electrode disk and groove in the workpiece.
FIG. 4 is an enlarged fragmentary view schematically illustrating electrical current flow between the electrode disk and surfaces of the groove.

During continued formation of the groove 12, the periphery of the electrode disk 18 moves into an overlapping relationship with the side surfaces 44 and 46 of the groove (see FIGS. 2 and 3). As this occurs, the previously established dense flow of current is maintained between the peripheral edge 54 and the bottom 60 of the groove 12. In addition, an electrical current flow of substantially lesser density is established between the major sides 40 and 42 of the electrode disk 18 and the side surfaces 44 and 46 of the workpiece 14. Although there is a flow of electrical current between the electrode disk 18 and workpiece 14, the electrode disk does not engage the workpiece and the electrolyte flows through the spaces between the sides of the groove 12 and the sides of the electrode disk.

Rotation of the electrode disk 18 sequentially moves the openings 52 into the groove 12, past the side surfaces 44 and 46 and out of the groove (see FIG. 2). As the openings 52 move past adjacent areas on the side surfaces 44 and 46 of the groove 12, the flow of electric current between the groove surface areas adjacent the openings 52 and the major sides 40 and 42 of the electrode disk tends to be interrupted. However, due to the sweeping action of the array of holes 52 past the side surfaces 44 and 46 of the groove and the conductivity of the electrolyte in the groove, it is believed that in all probability the openings 52 are merely effective to substantially reduce the rate of flow of electrical current and are not effective to completely stop the flow of electrical current between the electrode disk and groove surface areas adjacent the openings.

Undesirable electrolytic erosion of the sides 44 and 46 of the groove 12 is minimized by limiting the extent of exposure of the sides 44 and 46 of the groove to solid surface areas on the electrode disk 18. Therefore, it is preferred that the openings 52 have a radial extent such that the openings are not completely overlapped by the side surfaces 44 and 46 of the groove 12 (see FIGS. 2 and 3). Accordingly, the configuration and location of the openings 52 is advantageously such that the depth of the groove 12 is insufficient to enable the side surfaces 44 and 46 of the groove to completely overlap any arcuate segment of the circular path which is swept by the openings as they move through the groove.

The manner in which the electrical current flows between the electrode disk 18 and the workpiece 14 is illustrated schematically in FIG. 4. A relatively dense electrical current is established and maintained between the annular peripheral edge 54 of the electrode disk 18 and the bottom surface 60 of the groove 12. This electrical current flow has been indicated schematically at 62 in FIG. 4. To promote a uniform flow of current and electrolytic cutting action, the peripheral edge 54 is continuous, that is free of openings or other discontinuities.

The current flow between the major side 42 of the electrode disk 18 and the side surface 46 of the groove 12 is reduced by the presence of the holes 52 which extend between the opposite major side surfaces 40 and 42 of the electrode disk 18. This has been indicated schematically in FIG. 4 wherein the electrical current flow between the major side 42 of the electrode disk and the side surface 46 of the groove is indicated schematically at 64. Since the opening 52 sweeps past the major side 46 of the groove 12, the overall current density between the side of the disk and the side of the groove is substantially reduced. Of course, as the openings 52 move past an area on the side surface 46 of the groove 12, the current is reestablished. However, the next preceding opening immediately effects an reduction in this current.

In addition to reducing the density of the electrical current between the major sides 40 and 42 of the electrode 18 and the side surfaces 44 and 46 of the groove 12, the openings 52 promote a flow of electrolyte through the groove to retard fouling of the electrode disk 18 as material is electrolytically removed from the workpiece 14. Thus, droplets of the electrolyte 30 tend to be trapped or held in the openings 52 so that the electrolyte is carried through the groove 12 with a flushing action. This flushing action reduces the tendency for material removed from the workpiece to collect around the surface of the electrode.

Of course, the width and depth of the groove 12 will vary with variations in the type of workpiece 14 in which the groove is to be electrolytically cut. However, it is believed that the electrode disk 18 will advantageously be used to form relatively narrow grooves having a width or distance between side surfaces 44 and 46 of 0.011 inch or less. The width of the groove will be approximately 0.001 inches greater than the axial thickness or distance between the major sides 40 and 42 of the electrode disk 18. Therefore, in order to form a narrow groove in a workpiece, it is contemplated that the electrode disk 18 will have a thickness of 0.010 inch or less.

Metal sheets of a thickness of 0.011 inch or less will tend to have the flexibility of foil. However, the motor 22 rotates the flexible electrode disk 18 at a relatively high speed so that centrifugal force is effective to hold the flexible electrode disk 18 with the major sides 40 and 42 extending outwardly perpendicular to the axis 20 about which the disk is rotated. This enables the electrode disk 18 to be formed of relatively thin sheets of metal or foil which are capable of forming narrow grooves in a workpiece when openings, similar to the openings 52, are provided in the disk.

It is contemplated that many different types and sizes of electrode disks 18 can be used to form grooves 12 of many different configurations in workpieces 14 of many different materials. However in one specific instance an electrode disk 18 was formed of brass. This electrode disk had a diameter of approximately seven inches and a thickness, that is a distance between opposite sides 40 and 42 of approximately 0.0035 inch.

During a groove forming operation the aforementioned electrode disk 18 was rotated at a speed of approximately 3,600 rpms. The electrolyte 18 was a water solution of commercially available "Anacut 90" (trademark). However, any other suitable electrolyte could have been used. An electrical potential of about seven volts was established between the electrode 18 and the workpiece 14. The workpiece 14 was formed of tool steel and moved at a feed rate of approximately 0.3 inches per minute. This resulted in the formation of a slot having a width, that is distance between side surfaces 44 and 46 of approximately 0.0037 inches.

When working with very narrow grooves and thin disks, it is preferred to provide a stationary non-conductive guideway comprising elements 64 and 65 positioned at opposite sides of the disk and spaced apart very slightly in excess of width of the groove 12. Guideway 64 and 65 may be lubricated by the electrolite picked up from tank 28.

The foregoing description of a specific electrode disk and operating conditions is set forth for purposes of clarity of description and it should be understood that different electrode disks and operating conditions could be used if desired. For example, the electrode disk could be formed of an electrically conductive metal other than brass and the workpiece could be formed of a metal other than steel. It should be also understood that the electrode disk could be used to form grooves having many different configurations other than the linear configuration illustrated in FIG. 1 of the drawings. For example, the electrode disk could be used to form a groove which would extend completely through a workpiece to cut off a portion of the workpiece or to form a slot which extends between opposite sides of a workpiece.

In view of the foregoing it is apparent that the present invention provides a new and improved method of and apparatus for electrolytically forming relatively narrow grooves 12 which may extend either part way or entirely through a workpiece. Excessive groove width is avoided by reducing electrical current density between major sides 40 and 42 of the electrode disk 18 and the side surfaces 44 and 46 of the groove 12 as the groove is being formed. To reduce the density of electrical current 64 between the side surfaces 44 and 46 of the groove and the major sides 40 and 42 of the electrode disk 18, the electrode disk is provided with openings 52 which extend between the major sides of the disk. The openings 52 reduce the side surface area of the disk 18 available for the establishment of current flow to thereby tend to minimize the extent to which the sides of the groove are electrolytically eroded during formation of the groove.

Having described a specific preferred embodiment of the invention, the following is claimed:

1. A method of cutting a narrow groove in a workpiece formed of an electrically conductive material, said method comprising the steps of
   providing an electrode disk formed of an electrically conductive material and having a continuous circular peripheral edge,
   providing openings positioned radially inwardly from said continuous peripheral edge and extending axially inwardly from each major side of the disk toward the other major side,
   rotating the electrode disk about its central axis,
   establishing an electrical potential between the electrode disk and the workpiece,
   establishing a flow of electrolyte between the electrode disk and the workpiece,
   effecting relative movement between the rotating electrode disk and workpiece to bring them into close proximity,
   establishing a flow of electrical current between the rotating electrode disk and the workpiece to initiate formation by electro-chemical action of a groove in the workpiece,
   continuing the formation of the groove by continuing the movement of the rotating electrode disk and workpiece relative to each other to move the major sides of the electrode disk and side surfaces of the groove into an overlapping relationship,
   establishing a flow of electrical current between the side surfaces of the groove and major sides of the rotating electrode disk during continued formation of the groove,
   and moving the openings in the rotating electrode disk along the side surfaces of the groove to reduce the electrical current density between the side surfaces of the groove and the major sides of the electrode disk.

2. A method as set forth in claim 1 wherein said step of effecting relative movement between the electrode disk and workpiece is performed in such a manner that the depth of the groove in the workpiece is insufficient to enable the side surfaces of the groove to completely overlap any arcuate segment of a circular path swept by the openings in the major sides of the electrode disk during rotation of the electrode disk.

3. A method as set forth in claim 1 wherein said step of continuing the formation of the groove includes forming the groove with a width which exceeds the axial thickness of the electrode disk by less than 0.001 inches.

4. A method as set forth in claim 1 wherein said step of providing an electrode disk includes the steps of providing a flexible disk having an axial thickness of 0.010 inch or less, said step of rotating the electrode disk including the step of applying centrifugal force to the flexible electrode disk to maintain the major side surfaces of the electrode disk perpendicular to the axis of rotation of the electrode disk, said step of continuing the formation of the groove results in the formation of a groove having a distance between side surfaces of 0.011 inch or less.

5. A method as set forth in claim 1 wherein said step of moving the openings in the rotating electrode disk along the side surfaces of the groove to reduce current density includes the step of reducing the current density between areas on the side surfaces of the groove and the major sides of the electrode disk as the openings in the major sides of the electrode disk move into alignment with the areas on the side surfaces of the groove and subsequently increasing the current density between areas on the side surfaces of the groove and major sides of the electrode disk as the openings in the major sides of the electrode disk move out of alignment with the areas on the side surfaces of the groove.

6. A method as set forth in claim 1 wherein the step of establishing a flow of electrolyte includes the step of promoting a flow of electrolyte through the groove by retaining electrolyte in at least some of the openings in the electrode disk during rotation of the electrode disk.

7. A method as set forth in claim 1 wherein,
said step of establishing a flow of electrical current between the electrode disk and the workpiece to initiate formation of a groove in the workpiece includes the step of establishing a flow of electrical current with a first density between the continuous peripheral edge of the electrode disk and the workpiece,
and said step of establishing a flow of electrical current between side surfaces of the groove and the major side of the rotating electrode disk includes establishing a flow of electrical current with a second density between the major sides of the electrode disk and the side surfaces of the groove while maintaining a flow of electrical current with the first density between the continuous peripheral edge of the electrode disk and the workpiece.

8. Apparatus for cutting a narrow groove in a workpiece formed of an electrically conductive material,
comprising a rotatable electrode disk formed of an electrically conductive material,
means for rotating the disk about its central axis,
means for producing a flow of electrolyte between the disk and the workpiece,
means for establishing a flow of electrical current through the electrolyte between the rotating disk and the workpiece to initiate formation by electrochemical action of a groove in the workpiece,
means for effecting relative movement between the disk and workpiece and thereby cause the major sides of the disk and side surfaces of the groove to progressively move into an overlapping relationship and progressively deepen the groove,
said electrode disk having a continuous circular peripheral edge and circumferentially spaced openings extending from each major side surface toward the other and positioned radially inwardly from the peripheral edge and within the overlapped portions,
said openings acting to reduce the electrical current density between the side surfaces of the groove and the major sides of the electrode disk.

9. Apparatus as set forth in claim 8 wherein said disk is flexible and has an axial thickness of 0.010 inch or less, and said electrode disk is rotated at such a speed that centrifugal force causes the flexible electrode disk to maintain the major side surfaces of the electrode disk substantially perpendicular to the axis of rotation of the electrode disk resulting in the formation of the groove having a distance between side surfaces of 0.011 inch or less.

10. Apparatus as set forth in claim 8, and further including guide means disposed on respectively sides of the electrode disk to maintain the major sides surfaces thereof substantially perpendicular to the axis of rotation.

11. Apparatus as set forth in claim 8 wherein said electrode disk has a continuous circular peripheral edge and the said openings are positioned radially inwardly from said peripheral edge and extend entirely through said disk.

* * * * *